United States Patent [19]

Narang

[11] 4,423,910
[45] Jan. 3, 1984

[54] REVERSIBLE TRACK LINK ASSEMBLY AND TRACK SHOES THEREFOR

[76] Inventor: Rajendra K. Narang, 1525 Bonnie Rd., Macedonia, Ohio 44056

[21] Appl. No.: 352,093

[22] Filed: Feb. 25, 1982

Related U.S. Application Data

[62] Division of Ser. No. 905,209, May 12, 1978, Pat. No. 4,324,437.

[51] Int. Cl.³ .............................................. B62D 55/28
[52] U.S. Cl. ........................................ 305/54; 305/39
[58] Field of Search .................................. 305/54-55, 305/39

[56] References Cited

U.S. PATENT DOCUMENTS

| | | | |
|---|---|---|---|
| 2,211,897 | 8/1940 | Johnston | 305/54 |
| 2,329,303 | 9/1943 | Stewart | 305/54 X |
| 3,416,846 | 12/1968 | Eastman | 305/54 |
| 3,937,530 | 2/1976 | Sturges | 305/54 |
| 4,121,875 | 10/1978 | Stedman | 305/54 X |

FOREIGN PATENT DOCUMENTS 517867 12/1920 France .................................. 305/54

*Primary Examiner*—Charles A. Marmor
*Attorney, Agent, or Firm*—Maky, Renner, Otto & Boisselle

[57] ABSTRACT

In an endless track for crawler type vehicles, a plurality of identical, reversible track links are articulately interconnected in transversely spaced pairs into an endless chain by sealed pivot assemblies including readily replaceable hardened wear inserts at points of greatest fatigue. Track shoes consisting of two selectively independently replaceable plates are secured to and extend between the corresponding outwardly bowed rail surfaces on the transversely spaced links of each link pair for operation until wear of the plates and/or links necessitates on site, life extending maintenance initially to individual parts and eventually to the entire endless chain. In the latter event, the entire endless chain is serviced by disconnecting one master pivot assembly to take the chain off the vehicle, removing the track shoes from the unworn rail surfaces, securing the track shoes to the corresponding worn rail surfaces on the other side of the articulately interconnected track links, and then reassembling the chain on the vehicle by resecuring the one master pivot assembly to reform the endless chain with the unworn rail surfaces about the vehicle rollers and drive sprocket for continued operation with substantially the same parts.

6 Claims, 20 Drawing Figures

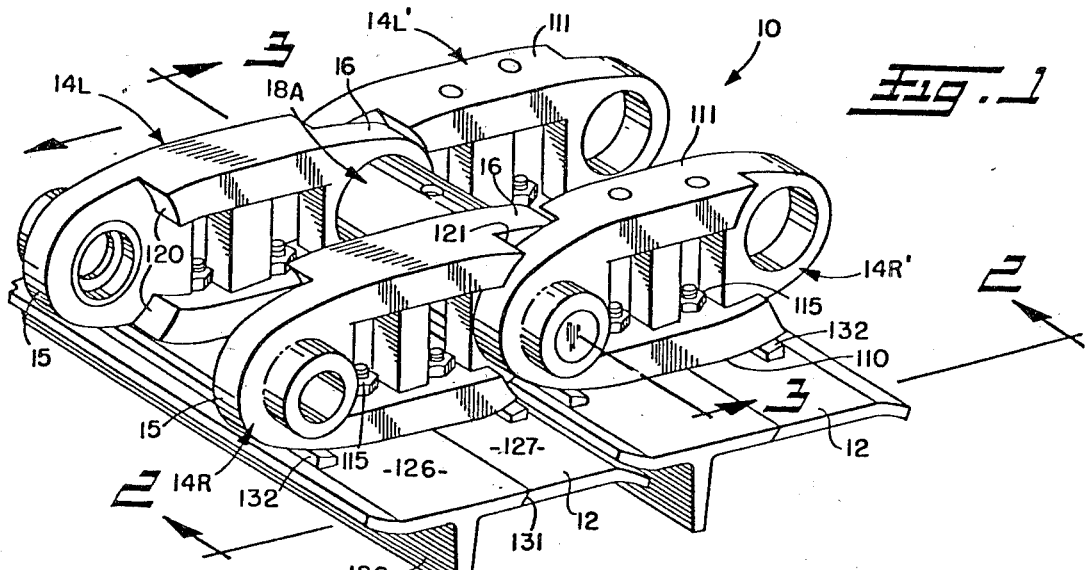
Fig. 1
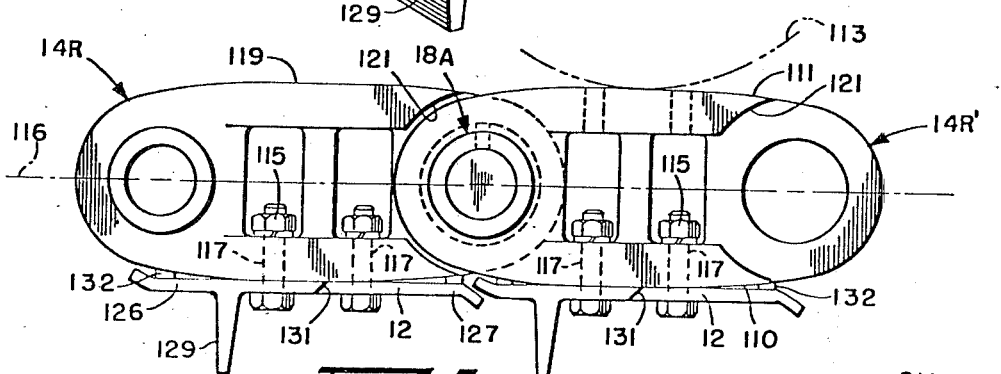
Fig. 2
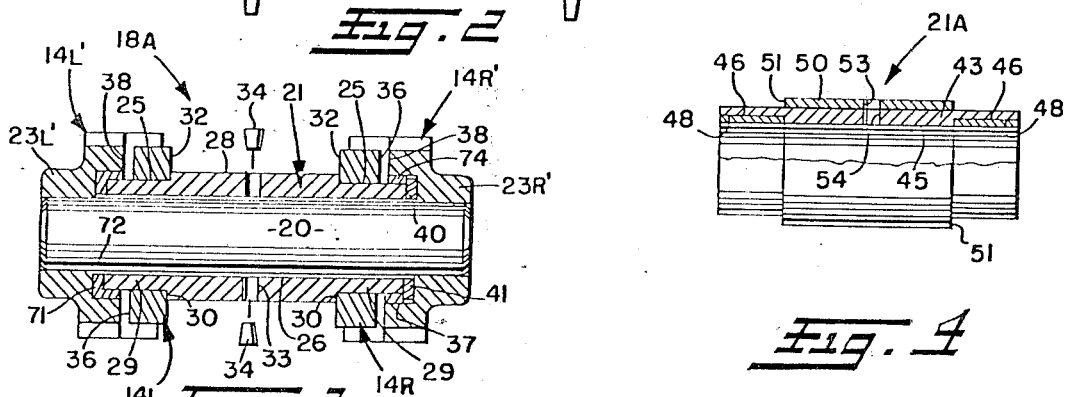
Fig. 3
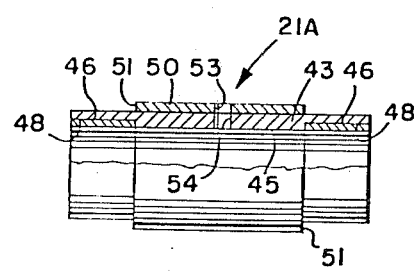
Fig. 4
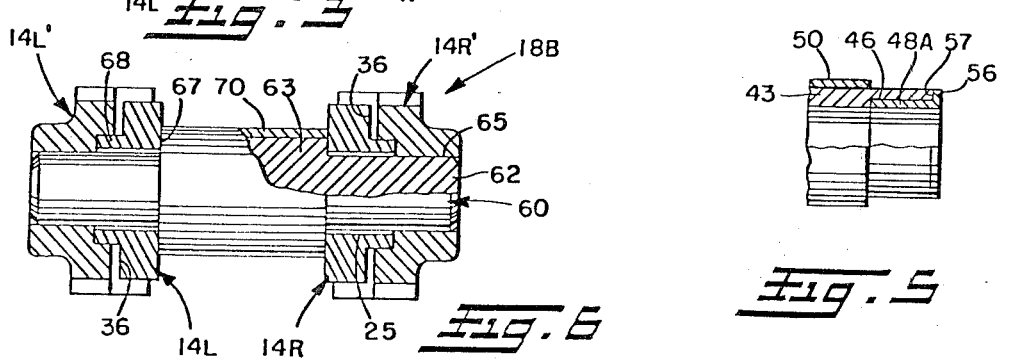
Fig. 6
Fig. 5

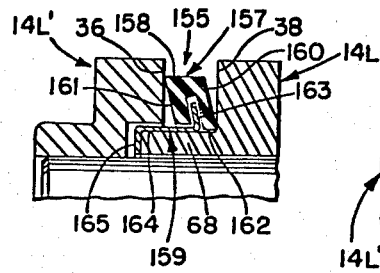
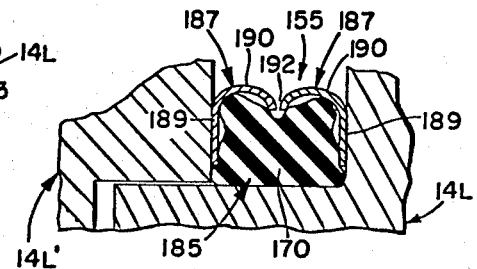
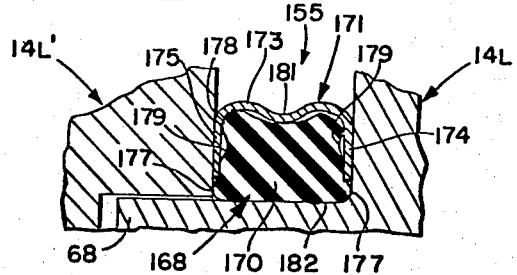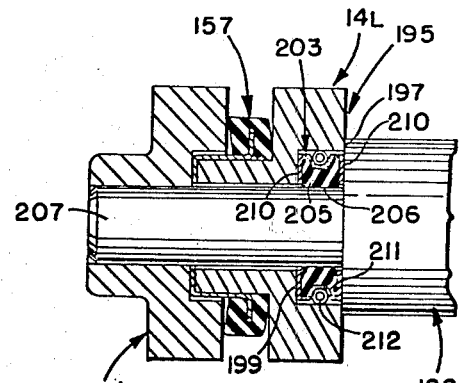
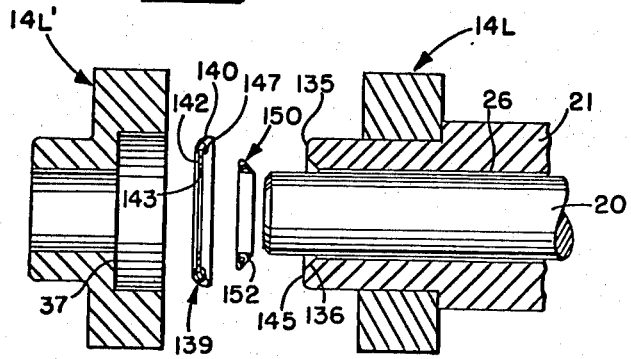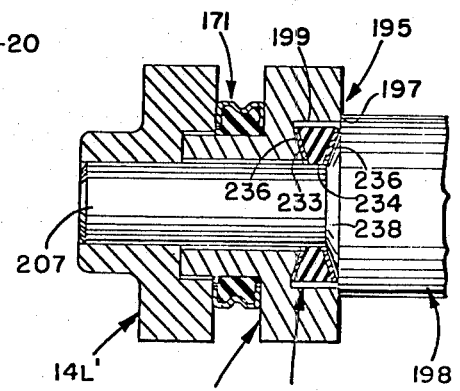
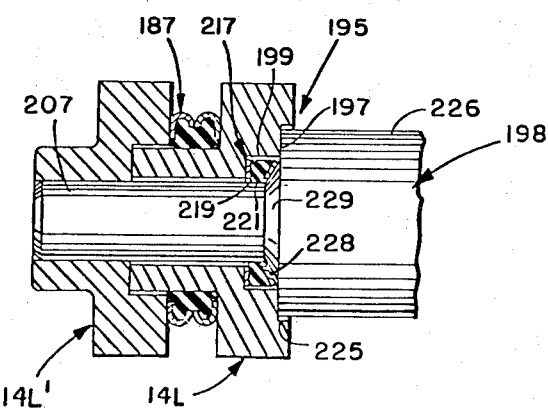

REVERSIBLE TRACK LINK ASSEMBLY AND TRACK SHOES THEREFOR

This application is a division of application Ser. No. 905,209, filed May 12, 1978 now U.S. Pat. No. 4,324,437, issued Apr. 13, 1982.

BACKGROUND

As generally indicated above, this invention relates to endless tracks for track-type vehicles, and more particularly to improvements in endless tracks and components therefor which provide for greater life and minimization of repair and maintenance costs.

Conventional endless tracks for use with track-type vehicles, such as crawler tractors, employ a plurality of closely coupled ground engaging track shoes which are carried by an endless track chain. The track chain comprises a plurality of pairs of track links which are articulately interconnected by track pins and track bushings for relative pivotal movement therebetween. The track chain is adapted to be trained over the rollers and sprockets of the vehicle, and the pin and bushing connections provide a drive means for coaction with a chain-driving sprocket whereby the track is forcibly driven by rotational movement of the sprocket.

Although such a track construction has gained wide acceptance, it is subject to several shortcomings. For example, in such prior art track constructions, the track links have along their radially inner edges rail surfaces upon which the rollers and wheels of the track-type vehicle roll. In operation, the rail surfaces are subjected to a high rate of wear, primarily at the longitudinal middle portions thereof, due to rolling contact with the rollers and wheels of the vehicle. It has also been found that wear of the middle portions of the rail surfaces are substantially accelerated due to the longitudinal gaps between adjacent links which in prior endless tracks are relatively large and thereby provide limited support for the rollers of the track-type vehicle. Such wear is further aggravated by the extreme use conditions the endless track is subjected to, either on account of highly corrosive earth conditions or because of abrasive elements such as sand, rocks and the like. When the rail surfaces have worn to such an extent that it affects the overall operation of the endless track, the track links must be repaired or discarded, either of which is relatively costly. Moreover, such maintenance of the endless track normally cannot be done at the work site requiring the return of the endless track to the factory or service garage, thus resulting in lengthy periods when the vehicle cannot be used.

Under the conditions in which the endless tracks operate, small abrasive particles, i.e., sand, mud, rock dust, etc., tend to work their way between the relatively moving parts of the endless track, such as between the counterbores of the track links and track bushings and between the track pins and track bushings. The removal of these foreign particles can normally only be accomplished by disassembling the endless track, which is an extremely expensive and time consuming procedure not adapted to a regular maintenance program. Further, because the track bushings are customarily case hardened and therefore are considerably harder than the track links or pins, the track links and track pins wear more rapidly than the bushings leading to their early replacement. Since track pins and bushings wear unevenly, it has been found that the useful lives of such track pins and bushings can be increased by rotating the same 180°, but such rotation requires disassembly and reassembly of the endless track, which is costly and time consuming and normally cannot be done at the work site.

Of course, many of the aforesaid problems can be minimized by providing dust seals to prevent abrasive elements from entering between the bearing surfaces of the relatively moving parts. The use of seals in endless tracks is well known, however, many of these dust seals are expensive to manufacture and others fail to provide adequate seals allowing entry of the abrasive elements.

SUMMARY

With the foregoing in mind, a primary object of the present invention is to provide an improved endless track and components therefor which exhibit substantially increased life in use at substantially less cost with job site maintenance capabilities.

It is another object of the present invention to provide such an improved endless track and components therefor having a high degree of structural integrity capable of being expeditiously serviced, if necessary.

It is a further object of the present invention to provide such an improved endless track employing wear resistant, but expendable bushings and sleeves, between the relatively moving components.

It is still another object of the present invention to replace the track pins and bushings with single pivot pins, and modified track links, that are less costly to manufacture.

Yet a further object of the present invention is to provide for dust seals for the endless track of low cost which have good sealing functions and which may endure thrust loads.

According to one aspect of the present invention, the endless track includes track links having rail surfaces along both longitudinal edges thereof upon which the rollers and wheels of a track-type vehicle can alternately, selectively ride. The track shoes are adapted to be secured to the track links at either of the rail surfaces. Therefore, the track links may be reversed in the endless track after the rail surfaces on one side thereof have been worn to permit the opposite unworn rail surfaces to then be used in engagement with the rollers, thus increasing the usable life of each link by a factor of two.

Reversal of the track links to permit the unworn rail surfaces to be in rolling engagement with the rollers may be accomplished without complete disassembly of the endless track. Instead, only one track link pivot assembly (e.g. a master link pivot assembly) need be disassembled to permit removal of the endless track from the vehicle for subsequent reversal of the entire track chain. To implement such reversal, the track shoes are removed from the unworn rail surfaces, the chain is flipped over, and the track shoes are then resecured to the track links at the worn rail surfaces. The endless track may then be retrained over the rollers and sprockets of the vehicle and the single previously disassembled master link pivot assembly reassembled. Accordingly, the rollers and wheels will subsequently roll on the unworn rail surfaces of the track links thus giving the track chain essentially a second life. Such reversal of the track chain also automatically rotates the unevenly wearing track pins and bushings 180° in relation to their previous position so that greater wear will occur along the less worn sides of the track pins and bushings thus increasing the useful lives of the same.

The useful lives of each respective rail surface may be further increased by arcuately contouring the surface profile to increase the thickness thereof from the ends to the middle of the rail surface. The resultant radially outwardly bowed profile provides additional rail surface material to be worn away at the middle thereof where wear occurs at a rate greater than at the ends of the rail surface, thus extending the useful life of each rail surface without substantially impairing the performance of the endless track during operation.

The trailing and leading ends of the track links are semicircular in shape and are provided with curved recesses or cutouts matingly to receive the trailing or leading ends of the next adjacent track links. The recesses of each track link have radii slightly greater than the radii of the curved ends of the corresponding mating adjacent track links to permit relative pivotal movement between the adjacent track links while in close longitudinal relationship with one another. The semicircular ends of the track links also provide an extension of the rail surfaces so that the rail surfaces effectively extend substantially the entire length of the track links, and when the track links are closely longitudinally spaced as assembled, the adjacent rail surfaces provide a substantially uniform, continuous support surface upon which the rollers ride.

The counterbore of the track link may have disposed therein an annular bushing insert which is generally cup-shape with the bottom and side thereof respectively abutting the bottom and sidewall of the counterbore in the track link. The inner diameter of the bushing insert is slightly greater than that of the end of the track bushing received therein to allow relative movement therebetween. The bushing insert, which is preferably hardened to resist wear, may be secured within the counterbore as by an interference fit. When the bushing insert becomes worn from extended use, only the relatively inexpensive bushing insert need be replaced rather than the entire track link.

According to another aspect of the present invention, the track shoe may be comprised of a forward and rear plate, the forward plate having a grouser bar on its ground-engaging surface. Both the plates are secured to the track links as by bolts with the forward edge of the rear plate overlapping the rear edge of the forward plate further to secure the forward plate with the grouser bar to the track link. When the grouser becomes worn, only the forward plate need be replaced.

In accordance with a further aspect of the present invention, passages or holes may be provided in the wall of the track bushing intermediate the ends thereof through which compressed air is directed to purge the abrasive elements from the annular space between the track pin and bushing. Further, the passages facilitate introduction of solid or liquid lubricants into the annular space between the track pin and bushing. Plugs or fittings may be inserted into the passages to close the same thereby to restrict entry of abrasive elements therethrough and to retain the lubricants therein.

The track bushing may include a tubular body which has a central bore in which the track pin rotates. Ring bushings may be disposed in counterbores in the tubular body at the respective ends of the central bore. Such ring bushings, which may be fixed or rotatable in their respective counterbores, provide bearing surfaces for the rotatable track pin received therein and projecting therethrough. A sleeve bushing is secured around the tubular body at its outer surface and provides shoulders at each end to maintain proper spacing of the track links secured to the ends of the track bushing. The sleeve and ring bushings are preferably hardened to resist wear, while the tubular body is preferably made of a relatively ductile material. Only the sleeve and ring bushings will become worn, and their replacement is relatively inexpensive. The ring bushings may further be provided with collars at their outer ends which overlie the end faces of the tubular body to prevent the ductile material of such end faces from wearing.

According to another form of the present invention, the track pin and bushing may be replaced by a pivot pin which has an increased diameter, intermediate spacer portion and two reduced diameter connection pins extending outwardly therefrom. The distal ends of the connection pins are secured in suitable openings in the end portions of one pair of track links for rotation therewith. The overlapping end portions of the next adjacent pair of track links are respectively disposed about the connection pins between the end portions of the one pair of track links and the spacer portion of the pivot pin for pivotal movement relative thereto. The overlapping end portions of such next adjacent pair of track links may be provided with tubular extensions which extend into counterbores in the end portions of such one pair of track links thereby to maintain proper spacing of the track links relative to each other. The connection pin portions of the pivot pin may be readily induction hardened to provide for increased wearability. Further, a hardened expendable sleeve may be fixedly secured around the spacer portion of the pivot pin. The pivot pin may be of integral construction or fabricated from stock parts, and in one form, the track pin may be readily disassembled to facilitate replacement of worn components and cleaning of the endless track.

By the present invention there are also provided various track seals which prevent foreign matter from entering between the wearing surfaces of the endless track components, the advantages of which will become evident from the following description.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a perspective view of a portion of an assembled endless track constructed in accordance with the present invention;

FIG. 2 is a side elevation taken along line 2—2 of FIG. 1 showing the portion of the endless track illustrated in FIG. 1;

FIG. 3 is a transverse sectional view taken along line 3—3 in FIG. 1 showing a pivot assembly between adjacent link pairs illustrating two alternative bushing insert forms at opposite ends thereof;

FIG. 4 is a partially broken away, transverse elevation of a fabricated track bushing constructed in accordance with the present invention;

FIG. 5 is a fragmentary view similar to FIG. 4 showing a fabricated track bushing employing a modified ring bushing;

FIG. 6 is a transverse sectional view similar to that shown in FIG. 3 illustrating another pivot assembly form between adjacent link pairs employing a modified pivot pin construction in accordance with the present invention;

FIG. 14 is an exploded transverse section of the pivot assembly of FIG. 3, including seals therefor constructed in accordance with the present invention;

FIGS. 15-17 show fragmentary sectional views of the track assembly shown in FIG. 6, illustrating various seals constructed in accordance with the present invention in their uncompressed state between adjacent links; and FIGS. 18-20 show the seals of FIGS. 15-17, respectively, in their compressed state, and further show various other seals constructed in accordance with the present invention and disposed between the link and shoulder of the pivot pin.

DESCRIPTION OF THE PREFERRED EMBODIMENTS

Figure 7:
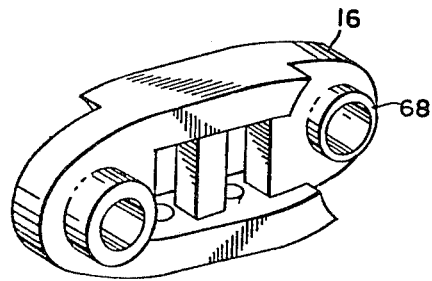
FIG. 7 is a perspective view of a modified track link used in conjunction with the pivot pin construction illustrated in FIG. 6.

Referring now in detail to the drawings and initially to FIGS. 1 and 2, a portion of an endless track 10, constructed in accordance with the present invention, is used on track-type vehicles such as tractor crawlers (not shown). The endless track 10 includes a plurality of ground-engaging track shoes or treads 12 and a plurality of articulately interconnected track links 14L and 14R to which the track shoes 12 are bolted, such track links having their leading end portions 15 disposed in an overlapping or nested relationship with the trailing end portions 16 of the next adjacent track links. Each pair of track links 14L and 14R, which are of identical but oppositely facing construction, are interconnected with one another in spaced parallel relationship and are pivotally interconnected with the next succeeding pair of links 14L' and 14R' by pivot assemblies 18A (FIG. 1) or 18B (FIG. 6) in such a manner that an articulated endless track chain is formed. The track chain, which may be readily trained over the rollers and sprockets of a tractor crawler, hingedly interconnects the track shoes 12 in known manner so that they can pivot or rotate relative to one another in describing an endless path as the track chain moves around the rollers and sprockets of the tractor. The endless track may also be provided with various dust seals, constructed in accordance with the present invention and illustrated in FIGS. 14-20, which prevent foreign matter from entering into the pivot assemblies of the endless track. For a complete understanding of the various aspects and embodiments of the invention, the elements as thus generally defined are described in detail below.

The Pivot Assembly 18A

Referring primarily to FIG. 3, each pivot assembly 18A includes a track pin 20 and a track bushing 21. The opposite ends of the track pin 20 are rigidly secured (as by an interference fit, e.g., shrink fit, press fit, etc.) in outwardly extending bosses 23L' and 23R' on the leading end portions 15 of the next succeeding pair of track links 14L' and 14R'.

The opposite ends of the track bushing 21 are rigidly secured (as by an interference fit) in suitable openings 25 in the trailing end portions 16 of track links 14L and 14R. The track bushing 21 has a central bore 26 through which the track pin 20 axially extends. The bore 26 is slightly larger in diameter than the track pin 20 so that bushing 21 and track pin 20 can rotate easily relative to one another. Such relative movement between bushing 21 with the links 14L' and R' connected thereto and rotating therewith and pin 20 with the links 14L and R connected thereto and rotating therewith provides the articulating interconnection between the successive link pairs. Thus, when the track chain passes around the rollers and sprocket of the tractor crawler, the associated track pin and track bushing rotate relative to each other to provide the necessary hinge action between the adjacent pivotally interconnected pair of track links.

The middle portion 28 of the bushing 21 is of a greater outside diameter than the end portions 29 thereof to form axially spaced shoulders 30 therebetween. The shoulders 30 abut the inner faces 32 of the trailing end portions 16 of the track links 14L and 14R to assist in maintaining such track links in spaced parallel relationship.

The middle portion 28 of track bushing 21 may include diametrically opposed passages 33 to provide for communication between the outside of the track bushing and the central bore 21 thereof to permit abrasive elements to be removed from the annular space between the track pin 20 and the track bushing 21. For example, one of the passages 33 may be connected to a source of pressurized air whereby sand and other abrasive materials may be blown out from between the track pin and track bushing through the other passage 33. The passages 33 will also facilitate lubrication of the endless track when fully assembled. Suitable plugs 34 may be provided to restrict entry of abrasive elements into the passages and to retain lubricants within and between the track bushing 21 and track pin 20.

The end portions 29 of the track bushing 21 extend beyond the outer faces 36 of the links 14L and 14R into counterbores 37 in the inner faces 38 of the next pair of track links, 14L' and 14R'. The diameters of the counterbores 37 are slightly larger than the outer diameters of the end portions 29 of track bushing 21 to permit relative movement therebetween. The ends 40 of the track bushing 21 abut bushing inserts 41 respectively seated in the blind ends of counterbores 37 and thereby serve to maintain the track links 14L' and 14R' in proper spaced relationship when subjected to lateral thrust forces as often occurs during operation of the track assembly.

Instead of the described one piece track bushing 21, which may be integrally cast and subsequently machined, track bushing 21A may be fabricated as shown in FIG. 4. The track bushing 21A includes generally tubular body 43 having a bore 45 therethrough with counterbores 46 at the opposite ends thereof. A tubular ring bushing 48 is housed in each counterbore 46 to form a continuous diameter bore through the entire bushing 21A. The ring bushings 48 may either be fixedly secured in the counterbores 46 or be freely rotatable therein, the latter case providing for more even wear of the ring bushings 48. The track bushing 21A further includes a cylindrical sleeve 50 which is disposed about and secured to tubular body 43. The sleeve 50 has a length essentially equal to the desired spacing between the trailing end portions 16 of links 14L and 14R to provide shoulders 51 which abut the inner faces 32 of such links when assembled. Aligned openings 53 and 54 in the sleeve 50 and bushing tubular body 43, respectively, may be provided for cleaning and lubricating the annular space between the track pin 20 and bushing 21A in the aforedescribed manner.

It should be appreciated that the sleeve 50 and ring bushings 48 may be readily induction or otherwise hardened to be more wear resistant than the tubular body 43, which is preferably made from a relatively inexpensive, unhardened ductile material. Further, eventual replacement of worn sleeve and ring bushings which are subjected to more wear than other bushing parts, is relatively inexpensive compared to replacing the entire track bushing.

As shown in FIG. 5, ring bushing 48 may be replaced by an alternative ring bushing 48A having a radially outwardly extending annular collar 56 at one end thereof. When ring bushing 48A is inserted in counterbore 46, the collar 56 overlies the end face 57 of the tubular body 43 to prevent wear of the unhardened metal forming the same. Accordingly, the collar 56 will abut either the bottom of the counterbore 37 or the bushing insert 41 in such counterbore 37 to assist in maintaining the track links 14L' and 14R' in their parallel spacial relationship as described in more detail below.

Alternative Pivot Assembly 18B

Turning now to FIG. 6, alternative pivot assembly 18B employs a single pivot pin 60 rather than the combined track pin 20 and bushing 21. The pivot pin 60 has connecting shafts 62 extending axially outwardly from opposite sides of an intermediate increased diameter spacer portion 63. The ends of the connecting shafts 62 are secured as by an interference fit in boss openings 65 of the leading end portions of track links 14L' and 14R' to pivot therewith. The connecting shafts extend through and are of smaller diameter than the respective bores 25 in the trailing end portions 16 of the next adjacent link pair 14L and 14R for free pivotal movement relative thereto.

With respect to maintaining the spaced parallel relationship between the respective link pairs, inner faces 32 of the trailing end portions 16 of the track links 14L and 14R respectively abut the shoulders 67 formed at the opposite ends of the intermediate increased diameter spacer portion 63. Such abutting relationship is maintained by outwardly extending tubular spacer projections 68 on the outer faces 36 of the trailing end portions 16 being respectively received in and abutting against the blind end of counterbores 37 in the leading end portions 15 of the next adjacent pair of links 14L' and 14R'. The spacer projections 68, which constitute the only structural variation to the link 14 of FIG. 1 required for using the "one piece" pivot pin 60, may be readily added to a link 14 in the field, if required, or may be integrally formed on the link as shown in FIG. 7, and such tubular projections 68 have outer diameters less than that of the counterbores 37 to permit relative rotation therebetween.

It should be appreciated that the pivot pin 60 is less expensive to manufacture than a conventional track pin and bushing, or for that matter, than the track pin 20 and track bushing 21. Further, the pivot pin 60 is particularly suited for induction hardening of the connecting shafts 62 to provide increased wear resistance, while the intermediate spacer portion 63 is unhardened and therefore resistant to impact loading. To resist wear at the outer surface of the intermediate spacer portion 63, a hardened sleeve 70 may be press fit thereon.

Figure 8:
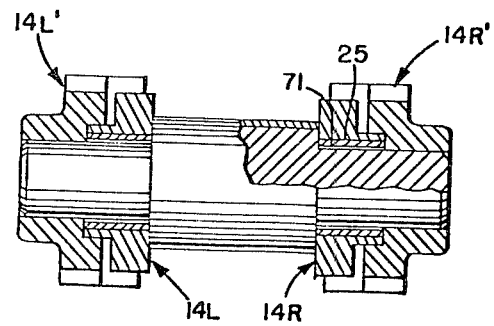
FIG. 8 is a transverse section similar to that shown in FIG. 6 employing a ring bushing in the tubular projection spacer on the modified track link of FIG. 7.

With reference to FIG. 8, the bores 25 in the trailing ends 16 of links 14L and 14R may have fixedly respectively secured therein, as by an interference fit, ring bushings 71. The ring bushing 71 is preferably hardened to provide increased wearability, and may be easily replaced when worn. Alternatively, the bores 25 may themselves be induction hardened to provide increased wearability initially, and when worn, may subsequently be machined for use with the ring bushing 71.

Figure 9:
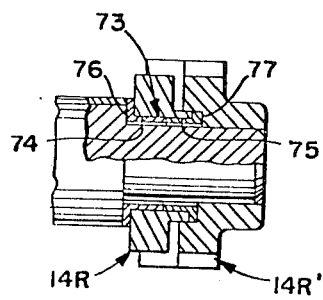
FIG. 9 is a fragmentary transverse section of the pivot assembly illustrated in FIG. 8 employing a modified ring bushing.

As shown in FIG. 9, a modified bushing indicated generally at 73 includes axially inner and outer portions 74 and 75, respectively. The inner portion 74 at its inner end includes a radially outwardly extending annular collar 76, which protectively overlies the inner face 32 of the trailing end portion 16 of the link. The outer bushing portion 75 at its outer end includes radially outwardly extending annular collar 77, which protectively overlies the end face of the tubular projection 68. These collars 76 and 77 prevent wear of the relatively soft material forming the respective faces of the links and pin 60 and also perform the required spacing functions by respectively abutting opposed link surfaces as shown in FIG. 9.

Figure 10:
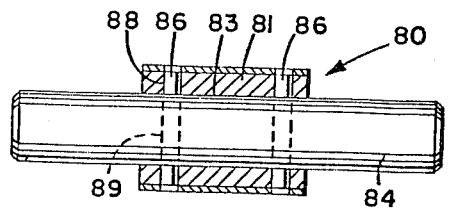
FIGS. 10-13 are transverse views, partly in section, of various fabricated pivot pins constructed in accordance with the present invention.

Instead of being of the aforedescribed integral construction, the pivot pin 60 may be fabricated in numerous different ways from readily manufactured stock parts as illustrated, for example, in FIGS. 10–13. Referring initially to FIG. 10, the pivot pin indicated generally at 80 includes a tubular body 81 having an outer diameter and length generally equal to that of the spacer portion 63 in FIG. 6, with a central axial bore 83 extending therethrough. Shaft 84, which has a diameter substantially equal to that of connecting shaft portions 62 in FIG. 6, is fixedly secured in central bore 83 as by an interference fit, with the ends thereof extending beyond the opposite ends of the tubular body 81 to form connecting end portions. The shaft 84 may be further secured to tubular body 81 to prevent relative rotation therebetween by retaining pins 86 being inserted in and extending through diametrically aligned openings 88 and 89 in the body 81 and shaft 84, respectively.

Figure 11:
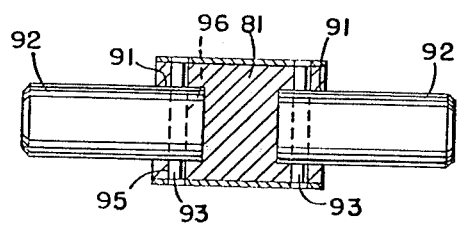

As shown in FIG. 11, instead of central bore 83, the body 81 may have coaxial blind end bores 91 in its ends. Such blind end bores each have a shaft 92 fixedly secured therein to extend axially outwardly from the respective ends of the body 81, to form connecting portions for the fabricated pin. The shafts 92 may be further secured against rotation relative to body 81 by retaining pins 93 inserted in and extending through diametrically aligned openings 95 and 96 in the body 81 and in the shafts 92, respectively.

Figure 12:
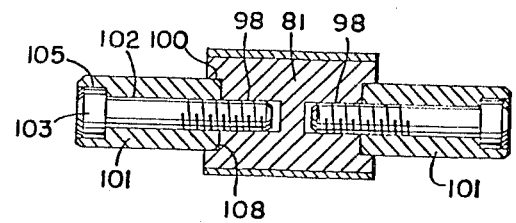
Figure 13:
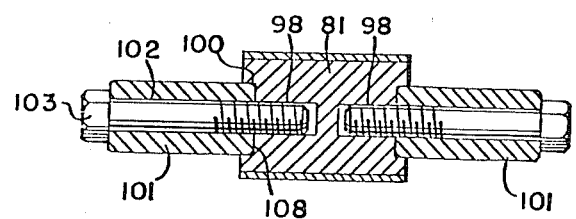

Referring now to FIGS. 12 and 13, the central body 81 is shown as including tapped, blind end axial bores 98 in each of its ends. Counterbores 100, which are coaxial with bores 98, are provided in the ends of the body 81 to facilitate seating of shaft members 101. Shaft members 101 include central openings 102 through which bolts 103 extend threadedly to engage tapped bores 98 to secure the shaft members 101 to the body 81 to form connecting end portions. The heads of bolts 103 may be recessed in counterbores 105 at the ends of the shaft members as shown in FIG. 12 or may be exposed as shown in FIG. 13.

It will be appreciated that the pivot assemblies 18A and 18B can all be individually disassembled, if necessary for maintenance purposes. In the embodiments of FIGS. 3-5, the pin 20 is first removed by axial displacement and then the links and bushing may be independently disassembled as required. In the single pin embodiment of FIGS. 6-9, each pivot assembly must be progressively removed by first removing the links from each axial end of the pivot assembly after the other ends of such links are unconnected, which requires that at least one pivot assembly in the endless track be of a construction permitting independent disassembly. In the fabricated pin embodiments of FIGS. 10-13, the enlarged diameter central portion 81 of the pin is freed from the shaft 84 or shaft portions 92 to either permit axial displacement of shaft 84 in the FIG. 10 form for disassembly or release of the central portion 81 by using the play in the link pairs to spread the same allowing central portion 81 to drop out in FIGS. 11-13 forms for disassembly. In the latter event, the axially inner annular edges of shafts 101 may be rounded as shown at 108 to facilitate removal of the shafts and central section 81 when the links are slightly spread.

The above described pivot assemblies 18A and 18B are used articulately to interconnect the track links into endless configuration, with at least one of the pivot assemblies being capable of independent disassembly (FIGS. 3-4 and 10-13) to act as a master pivot assembly for the links and for the maintenance reasons described below.

The Track Links

Referring again to FIGS. 1 and 2, the track links 14L and 14R commonly include along their longitudinal edges rail surfaces 110 and 111 on which the rollers 113 of the tractor crawler can alternately, selectively ride. The track shoes 12 in turn are adapted to be alternately, selectively secured to the track links at one or the other of the rail surfaces 110 or 111. In the assembly of FIGS. 1 and 2, the rollers 113 of the tractor crawler ride on the inner rail surfaces 111, and the track shoes 12 are secured by fasteners 115 to and extend between the respective track links of each pair of links at the outer rail surfaces 110 thereof. When the inner rail surfaces 111 become worn by the rollers, the track links 14L and R may simply be reversed and reused on the other side of the track chain. The track shoes 12, which have been removed from the previously unworn rail surfaces 110, are resecured to the reversed track links at the rail surfaces 111 now facing outwardly on the endless track chain. Accordingly, the length of service for a given track link is increased twofold because of its reversability.

It should be appreciated that the track links 14L and 14R are symmetrical above and below a horizontal plane 116 through the longitudinal center thereof so that they can be used interchangeably on either side of the same track chain by merely reversing the same through inversion. Therefore, no longer must there be provided both left-hand and right-hand track links. The track links 14L and 14R may be provided with two spaced bores 117 in both rail surfaces 110 and 111 selectively to secure the track shoes 12 thereto with fasteners 115 (see links 14L' and 14R' in FIGS. 1 and 2). Alternatively, the bores 117 may be provided in only one of the rail surfaces (see links 14L and 14R in FIGS. 1 and 2), and when the rail surface not provided with such bores becomes worn, the bores may be subsequently drilled therein to allow the link to be reversed for attachment of the track shoes to such worn rail surface.

It further should be appreciated that when all of the inner rail surfaces 111 of the track links 14 of the endless track 10 become worn, the track chain may be reversed to present the other unworn rail surface 110 without disassembling all the pivot assemblies 18 interconnecting the links as described above. More specifically, the endless track 10 may be removed from the tractor crawler, for example, by disassembling the pivot assembly for one master link. The track shoes 12 are then removed from the unworn rail surface 110 of all the track links and resecured to the track links at the worn rail surface 111. The endless track 10 may then be retained over the rollers and sprockets of the vehicle with the pivot assembly for the master link then being reinstalled to complete the assembly. This entire procedure may be done on the job site to reduce machine idle time and transportation costs. In addition, it will be appreciated that labor and parts costs are substantially reduced.

A further advantage also results from the automatic reversal of the track pin 20 and track bushing 21 (or alternate forms therefor) when the entire endless track 10 is reversed as described above. Customarily, the radially outer surface of the pin 20 and the radially outer surface of the bore 26 in the track bushing 21 (relative to the track 10) will tend to wear prematurely because they are subjected to greater forces as the endless track moves about the rollers and sprockets during operation. Moreover, the radially inner surface of the bushing 21 is also subjected to uneven wear from engaging the sprocket of the tractor crawler. Heretofore, it has been common practice to remove the track pin and track bushing and reinstall the same in the endless track rotated 180° so as to present the less worn surfaces at the greater wearing areas, thereby to increase the life of the same. However, by the present invention, the outer less worn portions of the track pin and track bushing are automatically rotated 180° when the entire endless track is reversed in the above described manner. This eliminates the costly and time-consuming disassembly and reassembly of each of the components in the entire endless track including the pivot assemblies, and further, such life extending reversal of the entire track may easily be done at the job site.

To provide additional link life, the rail surfaces 110 and 111 may have slightly arcuate contours to provide raised or outwardly projecting middle portions 119. Such arcuate contours do not impair the operation of the endless track 10 and do provide additional rail material to be worn at such middle portions 119 of the rail surfaces where wear is the greatest.

The trailing and leading end portions 15 and 16 of the track links are generally semicircular in shape and form a continuation of the rail surfaces 110 and 111, whereby such rail surfaces effectively extend substantially the entire length of the track links 14. The trailing and leading end portions of the track links also include offset inner and outer recesses or cutouts 120, 121, respectively, which matingly receive the trailing and leading end portions of the next adjacent links. The cutouts are rounded to have a radius slightly greater than the radius of the corresponding semicircular link end portions 15, 16 to permit the mating links to be closely longitudinally spaced while allowing relative pivotal movement therebetween. The gap or separation between the adjacent track links may thereby be reduced to a minimum to provide an essentially uniform, continuous support surface for the rollers 113 along substantially the entire length of the endless track.

Referring now to FIG. 3, the track links 14 may include cup-shape bushing inserts 71 respectively disposed in the counterbores 37 in the front ends 15 of such links. Although the cup-shape bushing 71 is only illustrated in link 14L' for purposes of drawing economy, it will be appreciated that the cup-shape bushing 71 (or alternative wear insert form) is operatively used in both links 14L' and 14R' for balanced wear and operation. The cup-shape insert 71 has its bottom wall positioned against the bottom of the counterbore 37 and its annular wall embracingly received against the sidewall of counterbore 37. An opening 72 is provided in the bottom of the insert 71 to permit passage of the pin 20. The cup-shape bushing insert 71 is disposed about the projecting end 29 of the track bushing 21 and has an inner diameter slightly greater than that of the track bushing to permit relative pivotal movement therebetween. The bushing insert is preferably hardened and thus more wear resistant than the link and may be replaced when worn without replacing the entire link, thereby to reduce maintenance costs while improving link life. Preferably, the outer diameter of the insert is equal or just slightly greater than the diameter of the counterbore 37, whereby it may be rigidly secured therein as by an interference or press fit.

Alternatively, a bottom wear washer 41 and annular wear ring 74, as shown in link 14R' for purposes of drawing economy, may be used instead of the cup shape bushing insert 71 for the same purposes. Again, it will be appreciated that normally either the bushing insert 71 or the wear washer 41 and ring 74 would be used on both sides of the endless track in operation. The wear washer 41 has an outer diameter slightly less than that of the counterbore 37 whereby it may be easily slipped into position. The wear ring 74, on the other hand, has an outer diameter equal to or slightly greater than counterbore 37 so that it may be secured therein to retain the wear washer 41 against the bottom of counterbore 37. The inner diameter of the wear ring 74 is slightly greater than the diameter of pin 20 to permit relative movement therebetween.

The track links described above and the inserts and assemblies associated therewith as described herein, are specifically designed to reduce maintenance, to reduce equipment downtime, and to increase the life of the parts. Similarly, such links, inserts and assemblies may be used with the track shoes and seals described hereinafter further to enhance these desirable functional attributes.

The Track Shoes 12

Referring once again to FIGS. 1 and 2, the track shoes 12 include forward and rear plates 126 and 127, respectively extending between and being connected to the rail surfaces of each link pair. Radially outwardly extending grouser bars 129 are formed on, welded to, or otherwise connected to the ground-engaging sides of each forward plate 126. Each plate is secured by nuts and bolts 115 to the track links 14. The trailing edge of the front plate 126 and the leading edge of the back plate 127 are complementally cut on a bias 131 so that the leading edge of the back plate abuttingly overlaps the trailing edge of the front plate when mounted further to secure the front plates 126 to links 14. After extended use, the grouser bars 79 will be worn down or off. In such case, only the forward plates 126 including the worn grouser bars 129 need be replaced by new forward plates with new grouser bars. The worn forward plates 129 may be either discarded or returned to the shop for welding new grouser bars 129 thereon.

Because of the contoured rail surfaces 110 and 111, the track shoes 12 will be supported only at the middle portions thereof with the forward and rear ends either being unsupported or being supported by reinforcing ribs 132 connected thereto. Such reinforcing ribs 132 are tapered along their radially inner edges to conform to the contour of the rail surfaces 110 (or, alternatively 111) at their points of supportive abutment. The ribs 132 may also extend substantially the width of the forward and rear plates 126 and 127, thereby serving to rigidify the same to reduce bending of such plates.

The Track Seals (FIGS. 14-20)

In operation of the track 10 as described above, abrasive elements, such as dirt, sand and the like, tend to enter into the gaps between adjacent faces 36 and 38 of the articulately interconnected track links 14 and 14' and migrate into the counterbores 37 and between the track bushings 21 and pins 20 causing accelerated wear of the various relatively pivoting surfaces. As shown in FIG. 14, track bushings 21 are often provided with rounded outer peripheral edges 135 and chamfers 136 at the entry to bore 26 to facilitate assembly of the respective pivot assemblies. Unfortunately, these relieved edges also facilitate entry of the abrasive elements into the link counterbores 37 and between the track pins 20 and bushings 21.

To restrict such entry of abrasive elements, the present invention may include an outer track seal 139 disposed within the counterbore 37 adjacent the rounded outer peripheral edge 135 of the track bushing 21. The outer track seal 139 includes an annular resilient body 140 mounted on the radially outer edge of an annular metal spring washer 142. The radially outer edge of washer 142 is bent at an angle and embedded in the resilient body to provide secure mounting therefor. The washer 142 also includes a central opening 143 for passage of the pin 21, with such opening 143 being substantially equal in diameter with pin 21 to provide an interference mounting fit therebetween. The resilient body 140 substantially conforms in shape to the relieved area between the rounded annular edge 135 of the track bushing and the adjacent side and bottom walls of the link counterbore 37 when telescopically assembled as indicated in FIG. 14. The resilient body 140 is preferably slightly larger than the relieved area before assembly so as to provide a slightly compressed sealing engagement with the respective adjacent surfaces during normal operation and to maintain the seal when track bushing end face 145 moves laterally away from the bottom of the counterbore 37 as may occur during operation. Because of the bent edge and the spring metal of washer 142, the resilient body 140 mounted thereon has its axially inner surface 147 flexed radially and axially outwardly by the washer 142 into sealing engagement with the link counterbore. During operation, as the track bushing 21 is thrust laterally towards the bottom of the counterbore 37, the axially sealing surface 147 forms a positive seal with the end of such bushing because of its shape and compressive qualities.

An inner track seal 150, which may be used in conjunction with outer seal 139, is composed of an annular resilient sealing member 152 which is substantially triangular in cross section. Such sealing member is initially slightly larger than the relieved area between the annular bushing chamfer 136 and adjacent surfaces of the link counterbore 37 and pin 20 to result in slight compression of the resilient seal material on assembly to provide a uniform positive seal across such adjacent surfaces. The compressed sealing member 152 may thus maintain sealing contact with such surfaces during relative operational movements therebetween by naturally resiliently expanding or contracting to conform to relatively moving surfaces. The inner seal may be hollow to permit greater compression of the sealing member without substantially increasing the sealing forces, thus reducing wear of the sealing member.

It should be appreciated that outer and inner track seals 139 and 150 may also be used in conjunction with an endless track employing the pivot pin of FIGS. 6 and 7. However, in such cases, the tubular extension 68 at its outer peripheral edge will be rounded, and at its inner peripheral edge, will be provided with a chamfer.

Turning now to FIGS. 15 through 17, three alternative seal forms are respectively shown disposed in the gap 155 between the adjacent faces of the articulately interconnected links. Such alternative seal forms may be used with either pivot assembly 18A or alternative pivot assembly 18B, although for purposes of convenience, such seal forms are exclusively shown and described in connection with pivot assemblies 18B. Each of the alternative seal forms are respectively shown in their uncompressed states in FIGS. 15–17 and in their compressed states in FIGS. 18–20.

The seal form 157 shown in FIG. 15 includes an annular resilient seal body 158 and annular spring metal mount 159 generally Z shape in cross section. The seal body 158 has parallel inner and outer, slightly outwardly skewed sidewalls 160 and 161, respectively. The radially inner wall 162 of the seal body 158 has support leg 163 of Z shape mount 159 embedded therein. The remaining legs 164, 165 of such mount cooperatively embrace the end of the outwardly extending projection 68 on link 14L to hold the seal in the assembled position shown in FIG. 15.

In such position, the diagonally opposed edges of the skewed seal sidewalls 160 and 161 are in slightly deformed sealing engagement with the facing walls 36 and 38 of the two coupled links. During slight lateral movements between the links during operation, the resilient seal body 158 will maintain sealing engagement with the link faces by compression or expansion as respectively illustrated in FIGS. 18 and 15. The Z shape mount 159 prevents radially outwardly directed movement of the seal body 158 to maintain the same in close proximity to the tubular extension 68 to form a tight seal therewith in all phases of operation. In addition, the seal form 158 provides for relatively constant loading during relative lateral movement of the track links due to the flexing of support leg 163 and the resiliency of the seal body.

The second seal form 168 shown in FIG. 16 includes an annular resilient seal body 170 disposed within an annular U-shape protective cover 171 which has an axially extending outer web 173 and radially extending inner and outer sidewalls 174 and 175, respectively. The cover sidewalls do not extend the full radial extent of the seal body resulting in the latter projecting axially outwardly therefrom adjacent the tubular extension 68 of link 14 as shown at 177. Preferably, such seal body normally has irregularly configured sidewalls and outer wall forming ridges 178 in engagement with the cover walls and depressions 179 removed from such cover walls, with the cover web being radially inwardly bent to form a pressure finger 181 engaging the outer wall of the seal body centrally thereof. When the seal form 168 is initially assembled as shown in FIG. 16, the cover sidewalls 174 and 175 and the seal body at 177 abut the opposing faces of the links to form a positive seal therewith and the radially inner wall 182 of the seal body sealingly contacts the tubular extension 68 of the track line. In operation, during relative axial movement of the links toward one another, the seal form 168 may be subjected to lateral thrust loads tending to cause the resilient seal body 170 radially to move away from the tubular extension 68. However, this tendency is overcome by a positive sealing force being applied to the seal body by pressure finger 181. Specifically, the movement of cover sidewalls 174 and 175 toward one another forces pressure finger 181 radially inwardly to force the seal body 170 and radially inner wall 182 thereof radially inwardly into positive sealing engagement with the tubular extension 68. Moreover, during such movement, the seal body assumes the shape of the cover by compression. By preferably having seal surface ridges 178, the degree of compression and forces experienced are reduced to increase seal life.

The third seal form 185 of FIG. 17 is substantially the same as the last described seal form 168, but instead of the U-shape cover 171, there is provided a pair of oppositely facing annular members 187 which are J-shape in section. The longer legs 189 of the J-shape members enclose the sides of seal body 170 and abut the opposed link faces, while the short curved legs 190 cooperatively encircle the radially outer edge of the seal and form a pressure finger 192. When the seal form 185 is laterally compressed, the pressure finger 192 is urged radially inwardly as shown in FIG. 19 which in turn radially inwardly urges seal body 170 positively to seal the same against the tubular extension 68.

With reference to FIGS. 18–20, three radially inner seal forms may be disposed in a seat 195 between shoulder 197 on the pivot pin 198 and the adjacent annular counterbore groove 199 on link 14L. Such radially inner seal forms may be used alone or in cooperation with the radially outer seal forms to preclude entry of abrasive materials.

Referring initially to FIG. 18, the first inner seal form 203 includes an annular resilient body 205 having its radially inner surface 206 mounted on and in sealing engagement with the end portion 207 of the pivot pin 198. The resilient seal body 205 is disposed within and abuts the blind end of counterbore groove 199 in the inner face of the trailing end portion 16 of the modified track link 14L, with such resilient body preferably having its sidewalls covered by protective annular wear plates 210. The radially outer surface of the resilient seal body 205 includes a circumferentially continuous groove 211 in which an annular spring 212 is disposed. The spring 212 has a normal diameter less than that of the groove 211, whereby the spring biases the radially inner surface 206 of the resilient seal body 205 into positive sealing engagement with the tubular extension 68 even when subjected to lateral thrust loads which would otherwise tend to force the annular resilient member radially outwardly. Moreover, the resilient seal body is of sufficient axial width such that sealing engagement between the sidewalls of the same and wear washers and their respective abutting surfaces of the link and pivot pin is maintained during relative axial movement of the link 14L and pivot pin which may occur during operation of the track, especially when the various wear surfaces thereof become worn.

Turning now to FIG. 19, a second inner seal form 217 includes an annular resilient sealing body member 219 which is disposed in and abuts against the blind end of counterbore seat 199 in the inner face of the track link 14L and abuts against the pin shoulder 197 for sealing engagement between the respective abutting surfaces. A second counterbore 225, of lesser depth but greater diameter, is also provided in the inner face concentric with counterbore seat 199. The second counterbore 225 receives the slightly smaller spacer member 226 of pin 198 to permit relative rotation therebetween. The seal body 219, which may be provided with annular wear plates at its sides, has a tapered sidewall 228 which abuts a similarly tapered chamfer 229 provided on the pin shoulder 197 normally to bias the seal body radially outwardly to assure a continuous seal between the pivot pin and track link. During operation, when the pin and link 14L move axially towards or away from each other, the tapered sidewall 228 and correspondingly tapered chamfer 229 slidingly cooperate radially outwardly or inwardly, respectively, to cam the seal body during such movement, thereby to maintain sealing engagement between the seal and, respectively, the pivot pin and link 14L at their abutting surfaces.

Referring finally to FIG. 20, the third seal form 232 shown therein includes an annular resilient body 233 having sidewalls 236 which are oppositely inclined, that is, the resilient member progressively increases in width radially outwardly and annular wear plates may be provided at the sidewalls 236. The shoulder of the pivot pin is provided with a chamfer 238 similar to that shown in FIG. 19, and the bottom of the counterbore 199 is also tapered, both the chamfer 238 and counterbore taper being inclined for sliding contact with similarly tapered sidewalls of the resilient member. Similar to the seal at FIG. 19, when the pin and link 14L move axially towards or away from each other, the inclined sidewalls 236 of the seal body 233 slidingly contact the inclined chamfer 238 and counterbore surface radially outwardly and inwardly, respectively, to cam the seal body, thereby to maintain positive sealing engagement between the seal and, respectively, the pivot pin and link 14L at their abutting surfaces.

The embodiments of the invention in which an exclusive property or privilege is claimed are defined as follows:

1. An endless track for crawler type vehicles or the like comprising a plurality of transversely spaced pairs of track links having first and second rail surfaces on the longitudinal edges thereof, pivot assemblies articulately interconnecting respective link pairs into endless configuration, and track shoes respectively secured to and extending between the correspondingly positioned first or second rail surfaces of each link pair, said track links being symmetrical above and below a horizontal plane through the center thereof to permit said track links and pivot assemblies after sufficient wear to be inverted and said track shoes to be secured to the other corresponding rail surfaces, thereby substantially to increase the use life of said track links and pivot assemblies, and said first and second rail surfaces being radially outwardly bowed relative to said track links to progressively uniformly increase in height from the opposite ends of each said rail surface to the middle thereof, thereby to provide additional rail surface material for wearing at a middle portion thereof.

2. The endless track of claim 1, wherein said track shoes include generally planar rail engaging surfaces abutting said rail surfaces at the middle portions thereof, said rail engaging surfaces having reinforcing ribs at opposite ends thereof to bear against the bowed ends of said rail surfaces to provide support for said track shoes at their ends.

3. The endless track assembly set forth in claim 1, wherein said first and second rail surfaces both include means thereon selectively alternately to secure said track shoes thereon.

4. The endless track of claim 1, wherein said track links have curved ends of reduced width forming extensions of said rail surfaces, said curved ends being closely received in correspondingly curved and positioned reduced width recesses in the next adjacent track links to form a substantially continuous rail surface about the entire endless track.

5. The endless track of claim 1, wherein at least one of said pivot assemblies may be independently disassembled to permit the track to be removed otherwise intact from the vehicle for removal of said track shoes, inversion of the entire track, and reassembly of said track shoes on the worn rail surfaces before reforming the track into endless configuration on the vehicle by reassembling the independently disassembled pivot assembly.

6. A track shoe for endless tracks or the like comprising first and second plates adapted to be secured to and extend between the respective links of a pair of transversely spaced links in longitudinal alignment with each other together to form a continuous ground engaging plate like surface, said first plate having a grouser bar protruding outwardly therefrom and extending transversely substantially the width of said first plate, whereby when said grouser bar becomes worn, said first plate may be replaced with another said first plate independently of said second plate, and wherein said first and second plates have respective adjacent edges when longitudinally aligned for securement to the transversely spaced links, and the adjacent edge of said second plate overlies the adjacent edge of said first plate whereby when said first and second plates are secured to said track links, said second plate further secures said first plate to said track links.

* * * * *